United States Patent
Enomoto (10) Patent No.: US 7,856,122 B2
(45) Date of Patent: Dec. 21, 2010

(54) METHOD AND DEVICE FOR COLLATING BIOMETRIC INFORMATION

(75) Inventor: Nobuyoshi Enomoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 995 days.

(21) Appl. No.: 11/700,093

(22) Filed: Jan. 31, 2007

(65) Prior Publication Data

US 2007/0177807 A1    Aug. 2, 2007

(30) Foreign Application Priority Data

Jan. 31, 2006   (JP)   .............................. 2006-022870

(51) Int. Cl.
- G06K 9/00 (2006.01)
- G06K 9/68 (2006.01)
- G06K 9/62 (2006.01)

(52) U.S. Cl. ........................ 382/115; 382/118; 382/218; 382/225

(58) Field of Classification Search .................. 382/115, 382/118, 224, 225, 124, 209, 218; 340/5.53, 340/5.8, 5.83; 713/186; 902/3, 6
See application file for complete search history.

(56) References Cited

U.S. PATENT DOCUMENTS

| | | | |
|---|---|---|---|
| 4,752,957 A | 6/1988 | Maeda | |
| 7,454,062 B2* | 11/2008 | Nishiyama et al. | 382/181 |
| 2004/0131236 A1* | 7/2004 | Chen et al. | 382/118 |
| 2005/0123202 A1 | 6/2005 | Hwang et al. | |
| 2005/0147291 A1 | 7/2005 | Huang et al. | |
| 2006/0177110 A1* | 8/2006 | Imagawa et al. | 382/118 |

FOREIGN PATENT DOCUMENTS

| | | |
|---|---|---|
| EP | 1 416 427 A2 | 5/2004 |
| JP | 60-57475 | 4/1985 |
| JP | 11-265452 | 9/1999 |

OTHER PUBLICATIONS

Kazuhiro Fukui et al. "Face Image Recognition Robust to Environmental Changes using Restrictive Mutual Subspace Method", Journal of institute of Electronics, Information and Communication Engineers vol. J82-DII, No. 4, Apr. 1999, pp. 613-620.

(Continued)

*Primary Examiner*—Daniel G Mariam
(74) *Attorney, Agent, or Firm*—Pillsbury Winthrop Shaw Pittman, LLP (57) ABSTRACT

A feature amount obtained from an image group for registration is stored as dictionary data in a memory. When an input image group constituted of a plurality of images is supplied to be collated with the dictionary data, the images constituting the input image group are classified based on a specific classification standard, a feature amount obtained from each of the classified image groups is collated with the feature amount stored as the dictionary data in the memory, and a result of the collation of all the input image groups with the dictionary data is determined based on a result of integrating a plurality of collection results of the classified image groups with the dictionary data.

20 Claims, 5 Drawing Sheets

OTHER PUBLICATIONS

Kazuhiro Fukui et al., "Face Feature Extraction by Combination of Shape Extraction and Pattern Recognition", Journal of Institute of Electronics, Information and Communication Engineers vol. J80-D-II, No. 8, Aug. 1997 pp. 2170-2177.

European Search Report dated Jun. 1, 2007 for Appln. No. 07002086.2-2218.

Masashi Nishiyama et al.; "Face Recognition with the Multiple Constrained Mutual Subspace Method"; Proc. 5$^{th}$ int. Conf. on Audio-and Video-based Biometric Person Avbpa205, LNCS 558, Jul. 20, 2005; pp. 71-80; XP019013337.

Fukui K et al.; "Face Recognition using Multi-Viewpoint Patterns for Robot Vision"; Proc 11$^{th}$ Int. Symp. Of Robotics Research ISRR2003; pp. 192-201; XP002432511.

Yamaguchi o et al.; "Face Recognition Using Temporal Image Sequence"; Automatci Face and Gesture Recognition, 1998; Proceedings, Third IEEE International Conference on NARA, Japan Apr. 14-16, 1998, Los Alamitos, Ca, USA, IEEE Comput, Soc, US, Apr. 14, 1998; pp. 318-323; XP010277627.

Viola et al., "Rapid object detection using a boosted cascade of simple features", proc. Of IEEE Conf. CVPR, pp. 511-518, 2001.

Takagi et al., "Handbook of Image Analysis"; pp. 648-651, Jan. 1991.

* cited by examiner

METHOD AND DEVICE FOR COLLATING BIOMETRIC INFORMATION

CROSS-REFERENCE TO RELATED APPLICATIONS

This application is based upon and claims the benefit of priority from prior Japanese Patent Application No. 2006-022870, filed Jan. 31, 2006, the entire contents of which are incorporated herein by reference.

BACKGROUND OF THE INVENTION

1. Field of the Invention

The present invention relates to a method and a device for collating biometric information, which are used for an entrance/exit management device for managing an entrance to/an exit from a security-needed room, facilities or the like to authenticate a person based on biometric information such as a face image obtained from the person.

2. Description of the Related Art

Conventionally, for example, in the collation device for collating biometric information such as a face image, the biometric information is generally obtained from a collation target person of a stable state. This is for the purpose of obtaining the biometric information under conditions as similar as possible to those of biometric information registered as a dictionary. In other words, it is to obtain the biometric information of the same state as that at the time of registration as much as possible by suppressing fluctuation in posture (e.g., face direction) of the person or an environmental change of an illumination light or the like as much as possible that the biometric information is obtained from the collation target person of the stable state (e.g., halted state) in the conventional collation device.

Additionally, a method for authenticating a person based on biometric information obtained from a moving (e.g. walking) person has recently been proposed. For example, Jpn. Pat. Appln. KOKAI Publication No. 60-57475 (Document 1) discloses a method for collating feature data obtained from a plurality of images continuous as input images with dictionary data obtained from a plurality of images for registration stored (registered) beforehand in a storage device. According to this method, a generated subspace is stored beforehand as dictionary data (dictionary subspace) based on a feature amount obtained from the plurality of images for registration, and similarities between a subspace (input subspace) generated based on the feature amount obtained from the plurality of images as the input images and the dictionary subspace are evaluated. Such a collation method is called a mutual subspace method.

Jpn. Pat. Appln. KOKAI PUBLICATION No. 11-265452 (Document 2) or pp. 613 to 620 "Face Image Recognition Robust to Environmental Changes using Restrictive Mutual Subspace Method" by Kazuhiro Fukui, Osamu Yamaguchi, Kaoru Suzuki, and Kenichi Maeda, Journal of Institute of Electronics, Information and Communication Engineers, vol. J82-DII, No. 4 (1999) (Document 3) describes a device for collating a face image by using the method described in the Document 1.

However, the collation device of the biometric information which uses the aforementioned conventional method has the following problems.

For example, according to the aforementioned conventional collation method of biometric information such as a face image, an unnatural movement or operation must be forced on a collation target person during collation. As an example, when a face image is used as biometric information, in the conventional collation device, a face image having a face direction or the like set similar as much as possible to that during registration is obtained as an input image to increase collation accuracy. In this case, a movement to fix a face or the like while the face is directed similarly to that during registration is forced on the collation target person. As described above, if an environment such as illumination conditions for photographing an input image is different from that during registration, collation accuracy is reduced.

According to the collation method (mutual subspace method) described in each of the Documents 1 to 3, determination is made as to whether a person is identical by generating the input subspace from the input image group and evaluating the similarity between the input subspace and the dictionary subspace generated from the image group for registration. According to the collation device of a face image using such a mutual space method, by generating the dictionary subspace (dictionary data) from the face image obtained under various conditions (e.g., face direction with respect to the camera, intensity of illumination, irradiation direction, and the like), it is possible to register the dictionary data which reflects various conditions. In other words, according to the mutual subspace method, desired collation accuracy can be maintained by reflecting fluctuation of conditions (condition fluctuation likely to occur during collation) predicted to include the input image in the dictionary data.

However, in the case of collating a face image by using a moving image obtained by photographing a moving recognition target person as an input image series (collating a face image of a moving person), there is a possibility that a movement of the collation target person will become large more than expected. In such a case, as a face direction, illumination conditions and the like fluctuate more than expected, there will be more input images of conditions not reflected in dictionary data. As a result, in the collation of the face image of the moving person by the conventional method, collation accuracy is reduced because of an influence of the image of conditions included in the input image series but unpredicted during registration.

BRIEF SUMMARY OF THE INVENTION

According to a first aspect of the present invention, there are provided highly convenient method and device for collating biometric information, capable of increasing accuracy of collation processing of the biometric information.

A method for collating biometric information, which is one embodiment of the present invention, comprises storing dictionary data based on an image group for registration in a memory; inputting the image group constituted of a plurality of images; classifying the input image group into a plurality of image subgroups based on a specific standard; collating each classified image subgroup with the dictionary data stored in the memory; and determining a result of collation of biometric information contained in each image of the input image group with the dictionary data based on a result of the collation of each classified image subgroup with the dictionary data.

A device for collating biometric information, which is another embodiment of the present invention, comprises a memory which stores dictionary data based on an image group for registration; an image input section which inputs the image group constituted of a plurality of images; a classification section which classifies the image group input by the image input section into a plurality of image subgroups based on a specific standard; a collation section which collates each image subgroup classified by the classification section with the dictionary data stored in the memory; and a determination section which determines a result of collation of biometric information contained in each image of the image group input by the image input section with the dictionary data based on a result of the collation of each image subgroup classified by the classification section with the dictionary data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The preferred embodiments of the present invention will be described below with reference to the accompanying drawings.

A collation device of each embodiment described below photographs a plurality of images (moving images) containing a face of a moving person by a camera, and collates feature data obtained from these photographed images with feature data preregistered as dictionary data. Each embodiment will be described by way of a collation device which performs collation based on a face image as one piece of biometric information contained in an input image.

The device and the method for collation described below can be applied to collation not based on a face image as long as feature data obtained from a plurality of images as input images is collated with dictionary data prestored in a storage device. Each embodiment will be described by way of case in which the collation device is applied to a person authentication system such as a person monitoring system for displaying a collation result of a face image in a display device or a traffic control system for controlling a passage of a person through a gate based on the collation result of the face image.

A first embodiment will be described.

Figure 1:
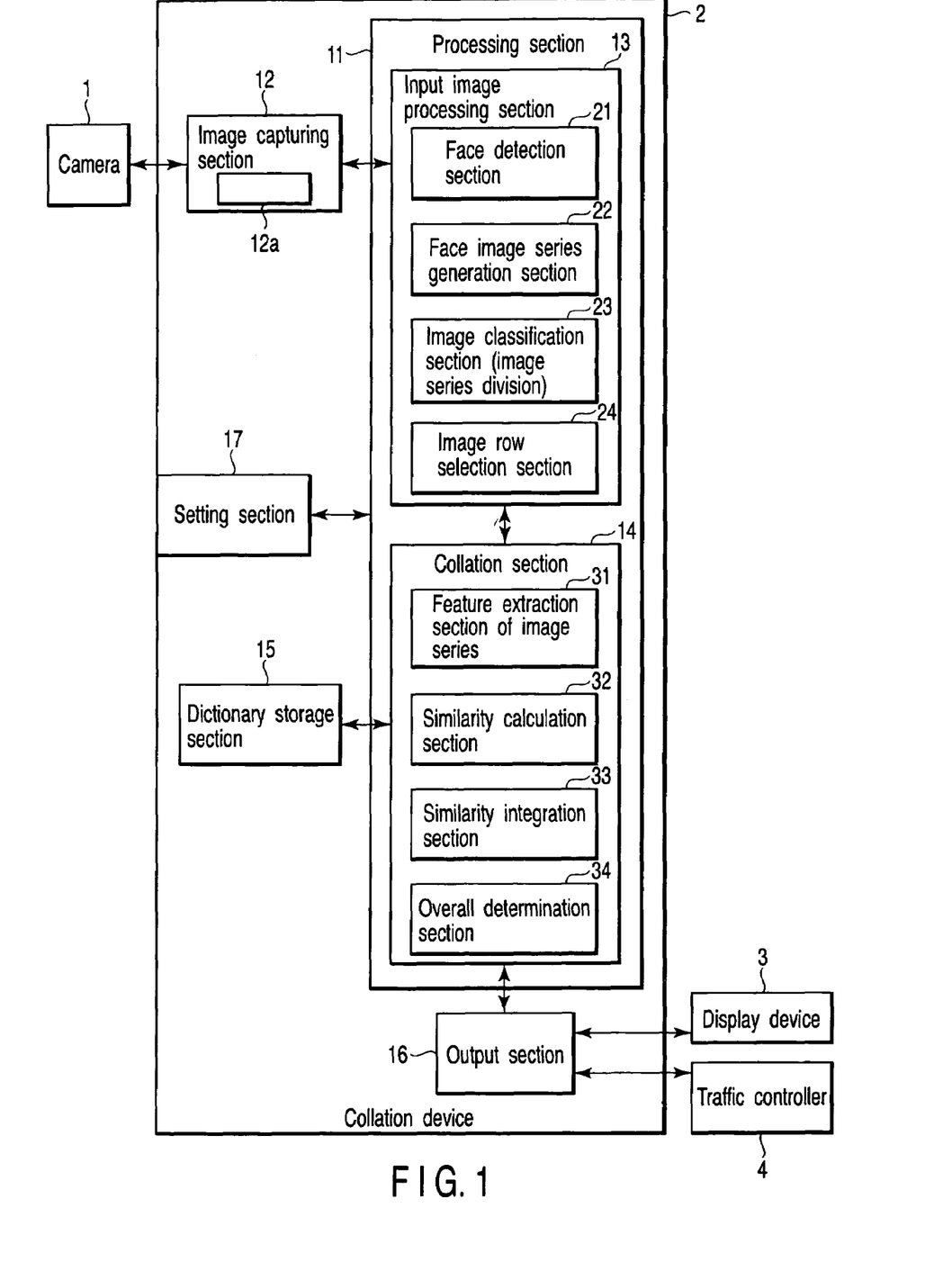
FIG. 1 is a block diagram schematically showing a configuration example of a collation device to which a collation method of biometric information is applied according to a first embodiment.

FIG. 1 is a block diagram schematically showing a configuration example of the person authentication system of the first embodiment.

As shown in FIG. 1, the person authentication system includes a camera 1, a collation device 2, a display device 3, and a traffic controller 4.

The camera 1 is for continuously photographing an image containing a face of a recognition target person. For example, the camera 1 is installed to photograph an image of a path or the like through which the authentication target person walks. In other words, the camera 1 photographs an image of the moving (walking) authentication target person.

The camera 1 is for photographing a moving image constituted of a plurality of images (frames) continuous at a predetermined cycle. For example, the camera 1 photographs an analog image, and supplies image data of each frame obtained by sampling the analog image at a predetermined cycle (e.g., 33 mseconds) to the collation device 1. The camera 1 may directly photograph an image in the form of a digital image. For example, each image data includes digital data having the predetermined number of bits (e.g., R, G and B signals are all 8 bits) for each pixel.

The collation device 2 is for collating input data (e.g., input subspace) as a feature amount obtained from a plurality of images (input image series or input image group) photographed by the camera 1 with dictionary data (e.g., dictionary subspace) as a feature amount obtained beforehand from an image series for registration (image group for registration). In other words, in the collation device 2, determination is made as to whether a person photographed by the camera 1 is a registrant whose dictionary data is preregistered based on a moving image photographed by the camera 1. In the collation device 2, a result of the aforementioned determination displayed by the display device 3, or a passage of the person is controlled by the traffic controller 4 according to the result of the determination.

A configuration example of the collation device 2 will be described.

As shown in FIG. 1, the collation device 2 includes a processing section 11, an image capturing section 12, a dictionary storage section 15, an output section 16, and a setting section 17. The processing section 11 includes an input image processing section 13 and a collation section 14.

The image capturing section 12 is an interface for capturing the moving image (plurality of images continuous at the predetermined cycle) photographed by the camera 1 into the collation device 2. The image capturing section 12 includes an internal memory 12a. The internal memory 12a stores the plurality of continuous images supplied from the camera 1 as images of an input image series.

The processing section 11 collates input data as a feature amount obtained from the moving images (input image series or input image group) photographed by the camera 1 with dictionary data prestored in the dictionary storage section 15. To realize such processing, as a result of processing, the determination result indicating whether the person of the face image contained in each image of the input image series is a registrant whose dictionary data is preregistered is output to the output section 16.

The input image processing section 13 processes image data of each frame (each image of input image series) of the moving images photographed by the camera 1 and captured by the image capturing section 12 to collate the input image series with the dictionary data stored in the dictionary storage section 15. In the input image processing section 13, a plurality of input image partial series (input image subgroups) are generated from the input image series (input image group)

based on a predetermined standard, and an input image partial series is selected from the input image partial series to be collated with the dictionary data.

As shown in FIG. 1, to realize the aforementioned processing, the input image processing section 13 includes a face detection section 21, a face image series generation section 22, an image classification section 23, and an image series selection section 24.

The face detection section 21 detects a face area from the image of each frame captured by the image capturing section 12, and generates a face image based on the detected face area. It is presumed here that image data (images of frames) fetched by the image capturing section 12 are stored in R, G, and B forms in the internal memory 12a. In this case, for example, the face detection section 12 performs conversion of an equation (1) below for the image of each frame. For image data obtained by such conversion, the face detection section 21 generates image data of a gray (luminance) component, and searches for a face area from the image data of the gray component. By such a method, the face detection section 21 can realize face image detection processing.

$$Y = 0.299 \times R + 0.587 \times 0.144 \times B \quad (1)$$

The face area detection processing may be realized by obtaining correlation values for the images of the frames while moving a template prepared beforehand to set a position of a highest correlation value as a face area. The face detection processing may be realized by a face extraction method using a unique space method or a subspace method. For example, the face area detection processing using the subspace method can be realized by using a method of "Face Area Extraction By Subspace Method" described in pp. 2170 to 2177 "Face Feature Extraction by Combination of Shape Extraction and Pattern Recognition" by Kazuhiro Fukui and Osamu Yamaguchi, Journal of Institute of Electronics, Information and Communication Engineers (D), vol. J80-D-II, No. 8 (1997) (Document 4).

Further, the face detection section 21 may check whether the detected face area is a face image. For example, checking of the detected face area can be realized by detecting a position of a part of a face such as an eye, a nose or a mouth from the detected face area portion. In this case, as a detection method of parts of the face, a method can be applied which selects part candidates obtained from shape features of an eye, a nose and a mouth end, compares these part candidates with preset subspace patterns of the parts, and selects a part candidate from a result of the comparison. For example, such a method can be realized by the method described in the Document 4.

The face area detection method may use a method which combines a plurality of simple identification circuits for outputting determination results of faces by using a plurality of rectangular filters to sequentially select them. For the combination of the plurality of identification circuits, an AdaBoost algorithm is employed. Accordingly, detection accuracy can be increased as a whole. For the aforementioned method, for example, a method described in "P. Viola and M. Jones, "Rapid object detection using a boosted cascade of simple features", proc. Of IEEE Conf. CVPR, pp. 511 to 518, 2001" (Document 5) can be applied.

The face image series generation section 22 generates a face image series (face image group) constituted of the face images detected from the images of the input image series by the face detection section 21. In this case, it is presumed that the face image series generation section 22 generates a face image series constituted of the predetermined number of face images. In other words, the face image series generation section 22 sequentially adds the face images detected from the images of the input face image series by the face detection section 21 until face images reach a predetermined number to generate a face image series.

The image classification section 23 classifies the images of the frames (images of the input image series) based on a predetermined standard (classification standard). In the image classification section 23, each image series (image group) constituted of classified images is an input image partial series (input image subgroup). In other words, the image classification section 23 functions as an image division section to divide the input image series as all input images constituted of images of all frames captured by the image capturing section 12 into a plurality of input image partial series based on the predetermined standard. Processing of the image classification section 23 will be described below in detail.

The image series selection section 24 selects one (image series to be collated) from the input image partial series classified by the image classification section 23 to be collated with the dictionary data stored in the dictionary storage section 15. In other words, the image series selection section 24 determines whether to set each input image partial series classified by the image classification section 23 as an image series to be collated with the dictionary data based on a predetermined standard. In this case, it is presumed that the image series selection section 24 selects at least one input image partial series to be collated with the dictionary data based on the predetermined standard (selection standard). The input image partial serieselected by the image series selection section 24 is supplied as an image series to be collated with the dictionary data to the collation section 14. Processing of the image series selection section 24 will be described below in detail.

The collation section 14 collates the input image partial series (image series to be collated) selected by the input image processing section 13 with the dictionary data stored in the dictionary storage section 15. For example, the collation section 14 generates an input subspace as input data from each input image partial series, determines a similarity between the input subspace and a dictionary subspace as each dictionary data stored in the dictionary storage section 15, and determines a collation result of a person of a face image detected from each image of the input image series with a registrant in a comprehensive manner based on the similarity.

To realize such processing, as shown in FIG. 1, the collation section 14 includes an image series feature extraction section 31, a similarity calculation section 32, a similarity integration section 33, and an overall determination section 34.

The image series feature extraction section 31 calculates a feature amount of all the image partial series (image seriess to be collated) supplied from the input image processing section 13. For example, the feature extraction section 31 extracts a feature vector as a face feature amount from each face image of the face image partial series, and generates a subspace (input subspace) based on a distribution of the feature vector extracted from each face image of the image series. In this case, the subspace is a statistical feature amount calculated based on a correlation among the feature amounts extracted from the images constituting the image series. Thus, when the number N of face image partial series are present, the image series feature extraction section 31 generates input subspaces equal to or less than N in number.

The processing of generating the input subspace as the feature amount of the image partial series presumes that a dictionary subspace data generated by the same method as that of the input subspace is present as dictionary data based on a registered image series. Further, the statistical feature amount of each face image partial series may be calculated by a configuration method of an input subspace based on the method of the restrictive space described in the Document 3 (Kazuhiro Fukui, Osamu Yamaguchi, Kaoru Suzuki, and Kenichi Maeda: "Face Image Recognition Robust to Environment Fluctuation Using Restrictive Mutual Subspace Method" Journal of Institute of Electronics, information and Communication Engineers (D), vol. J82-DII, No. 4, pp. 613 to 620 (1999)".

The restrictive space is obtained from various subspaces for one registrant. The restrictive space is configured such that a plurality of dictionary subspaces (dictionary subspaces in a cluster) in dictionary data (classes) of registrants are similar while dictionary data (classes) of the registrants are not similar. For example, when a plurality of image groups different from one another in photographing conditions are given as a registered image series of one individual, a restrictive space is configured by analyzing a main component of a difference subspace indicating a difference among the plurality of subspaces obtained from each image group.

The similarity calculation section 32 calculates a similarity between the feature amount of each input image series generated by the image series feature extraction section 31 and the dictionary data stored in the dictionary storage section 15. For example, when the feature amount of the input image partial series is an input subspace and the dictionary data is a dictionary subspace, the similarity calculation section 32 calculates a similarity between each input subspace and the dictionary subspace. Accordingly, when there are a plurality of input image seriess, the similarity calculation section 32 calculates similarities by an amount equal to the number of input image seriess regarding each dictionary data. A similarity between each input image series and the dictionary data is supplied to the similarity integration section 33.

A reason for the collation of the input subspace as the statistical feature amount of the face image partial series with the dictionary subspace as the statistical feature amount of the registered image series is that even similar image seriess (face image partial series or registered image seriess) contain fluctuation components unless images are identical. In other words, it is for the purpose of reducing an influence of fluctuation components contained in the face image partial series or the registered image series as a whole by executing collation based on a statistical feature of an image series constituted of a plurality of images.

For example, the similarity calculation processing of the similarity calculation section 32 may use "Restrictive Mutual Subspace Method" described in the Document 3. In this case, it is presumed that the dictionary data of each registrant is constituted of a plurality of dictionary subspaces obtained from a plurality of registered image seriess as registered images and a restrictive space obtained from a difference subspace among the dictionary subspaces. When an input image series to be collated with the dictionary data is given, an angle (canonical angle) between an input subspace projected to the restrictive space and a dictionary subspace projected to the restrictive space is calculated as a similarity between the input image series and the registered image series. As described above, even if photographing conditions are changed, a difference from the subspace of each individual is emphasized in the subspace projected to the restrictive space. Accordingly, collation accuracy for the similarity calculated by this method is high even if the photographing conditions are changed.

The similarity integration section 33 integrates a plurality of similarities calculated by the similarity calculation section 32. That is, when the number of input image partial series collated with one dictionary data is plural (i.e., when the similarity calculation unit 32 calculates a plurality of similarities with respect to one dictionary data), the similarity integration section 33 integrates the plurality of similarities (similarities with the plurality of input image partial series) with respect to one dictionary data. In other words, the similarity integration section 33 calculates a similarity of all the input image seriess (also referred to as an integrated similarity hereinafter) with respect to one dictionary data. Integration processing of the similarities will be described below in detail.

The overall determination section 34 determines an identify of a person of a face image detected from each image of the input image series in a comprehensive manner. For example, if a similarity with the input image series is largest, and there is dictionary data in which the similarity is equal to or larger than a predetermined threshold value, the overall determination section 34 determines that the person of the face image detected from each image of the input image series is a registrant of the dictionary data. If there is no dictionary data in which the similarity determined by the similarity integration section 33 is equal to or larger than the predetermined threshold value, the overall determination section 34 determines that there is no registrant matched with the person of the face image detected from each image of the input image series. In the case of executing collation with specific dictionary data, the overall determination section 34 determines whether the person of the face image detected from each image of the input image series is a registrant of the dictionary data based on whether a similarity between the input image series and the dictionary data is equal to or larger than a predetermined threshold value. A result of the determination by the overall determination section 34 is supplied to the output section 16.

The dictionary storage section 15 is for storing a feature amount of an image series for registration or the like as dictionary data. The dictionary storage section 15 includes a storage device such as a hard disk drive. The dictionary storage section 15 also stores information such as identification information, a registrant name or an attribute corresponding to each dictionary data. The identification information is information for specifying a relevant person (registrant). The image series for registration includes a plurality of images including a face of the registrant. For example, for the image series for registration, moving images (plurality of continuous images) including the face of the registrant photographed by the camera 1 are used. For the image series for registration, the plurality of images including the face of the registrant may be input from an external device (e.g., reader of a storage medium).

For the dictionary data stored in the dictionary storage section 15, a feature amount generated by the image series feature extraction section 31 from the image series for registration is used. For example, in the registration processing of the dictionary data, a face image is detected from each image of the image series for registration, a feature vector is generated as a facture amount of each face from each face image, a subspace (dictionary subspace) is generated from the feature vector, and the dictionary subspace is stored in the dictionary storage section 15 so as to correspond to information such as identification information. In the registration processing, the face image extraction method, the face feature amount extraction amount, and the subspace generation method can be realized by the same methods as those of the face detection processing of the face detection section 21, the processing of the face image series generation section 22, and the processing of the image series feature extraction section 31.

The output section 16 is for outputting the determination result of the collation section 14. For example, in an operation form for displaying the determination result in the display device 3 (person monitoring system), the output section 16 controls the display device 3 to display a guidance indicating the determination result. In an operation form for controlling a passage of the person based on the determination result (person traffic control system), the output section 16 outputs information indicating permission/inhibition of the passage or information indicating the determination result to the traffic controller 4. Accordingly, the traffic controller 4 executes traffic control for the person based on the information supplied from the output section 16.

The setting section 17 is for enabling an operator (manager or the like) to perform various settings. For example, the setting section 17 includes a keyboard through which the operator inputs information, and an interface through which each section sets (stores) a set value. For example, the setting section 17 sets a selection standard for selecting an input image partial series in the image series selection section 24. The setting section 17 also sets a classification standard for classifying each image of the input image series into an input image partial series in the image classification section 23.

Next, the image classification processing (division processing of the image series) of the image classification section 23 will be described in detail.

The processing of the image classification section 23 is for classifying face images of the face image series (processing for dividing the face image series into face image partial series). According to this processing, as described above, the face images constituting the face image series are classified to generate a face image partial series of each class based on the predetermined classification standard. The classification standard is properly set based on an installed state of the collation device, an operated state of the collection device or the like. A reason for executing the image classification processing and the classification standard will be described below.

First, the reason for classifying the images of the input image series (dividing the input image series into image partial series) will be described.

In the collation processing based on image information such as face information, an input image (feature amount obtained from the input image) of a collation target is collated with a registered image (feature amount obtained from the registered image) preregistered as dictionary data. Accordingly, the input image and the registered image are preferably images photographed under conditions as similar as possible.

However, when an image obtained by photographing a face of a moving person is set as an input image, it is difficult to obtain an input image photographed under conditions completely similar to those of the registered image. Thus, in the system for authenticating the face of the moving person, a feature amount (statistical feature amount) obtained from an input image series constituted of a plurality of images such as moving images is collated with a feature amount (statistical feature amount) obtained from a registered image series constituted of a plurality of registered images. Accordingly, in walker authentication, a difference between the input image and the registered image is absorbed.

As an exceptional image of photographing conditions greatly different from those of the registered image is included in the input image series even if the aforementioned processing is executed, there is a possibility of a tremendous reduction in collation accuracy.

For example, there is a possibility that the moving person will make unexpected exceptional motion. As an example, the moving person may temporarily take a posture greatly different from the registered image. In such a case, the input image series of the photographed moving person includes an exceptional image obtained by photographing the person of a posture greatly different from the registered image. There is also a possibility that photographing conditions for illumination or the like will become exceptional conditions because of an external light (light uncontrollable by the collation device). In such a case, the input image series of the photographed moving person includes an exceptional image photographed under photographing conditions greatly different from those of the registered image.

If the exceptional image is included in the input image series, the statistical feature amount obtained from the input image series is greatly affected by the exceptional image. As a result, there is a possibility of a tremendous reduction in collation accuracy between the input image series including the exceptional image and the dictionary data.

When the images of the input image series are classified into a plurality of input image partial series based on the predetermined classification standard, the input image partial series of each class can be collated with the dictionary data. In other words, when each input image partial series of the image classified based on the predetermined classification standard is collated with the dictionary data, a collation result (similarity to dictionary data) is obtained for each input image partial series of each class.

Accordingly, it is possible to eliminate the input image partial series constituted of the image classified as the exceptional image. Besides, it is possible to obtain an overall determination result with respect to all the input image seriess with importance placed on a collation result (similarity) with the input image partial series of images classified as images to satisfy desired conditions (conversely, with less importance placed on a collation result (similarity) with the input image partial series constituted of images classified as images not to satisfy the desired conditions) in the collation processing with the dictionary data.

As described above, by classifying the input image series into the plurality of input image partial series based on the predetermined classification standard, it is possible to eliminate an input image greatly different from each image of the registered image series and to reduce a contribution to a last collation result. A resultant possibility of improving collection accuracy for the input imager series is a reason for classifying the images of the input image series (dividing the input image series into the plurality of input image partial series).

Next, the classification standard for classifying the images of the input image series will be described.

To improve the collation accuracy, the classification standard is set, depending on what images constituting the input image series should be used for preferred collation between the input image series and the dictionary data, or for a significant collation result between the input image series and the dictionary data. In other words, the classification standard is properly set in accordance with a setting state of the collation device, a state of the registered image series, an operation state of the collation device or the like. The classification standard can be set by the setting section.

As an example of the classification standard, first, classification based on a correlation (similarity) among the images of the input image series is conceivable. In this case, for the classification standard, a standard regarding the similarity among the images is set. In the collation device 2, collation based on the face image included in the input image is assumed. Accordingly, for the classification standard regarding the similarity, for example, it is only necessary to set a reference value with respect to a similarity among face images detected from the images of the input image series. In this case, the images can be classified into a face image in which the similarity among the face images detected from the images of the input image series is equal to or larger than a predetermined reference value, and other face images.

For the classification standard with respect to the similarity among the face images, a classification standard may be set for an inverse number of a sum total of luminance difference values of pixels constituting an image of a face area. Additionally, for the classification standard with respect to the similarity among the face images, a standard may be set with respect to an average luminance of images of the face area, up-down and left-right luminance gradient of the images of the face area, a three-dimensional direction of the face, or the like.

For example, the average luminance of the images of the face are indicates brightness of all the images of the face area. Thus, by setting a classification standard for the average luminance of the images of the face area, the image classification section 23 can classify the images into a face image of predetermined brightness or higher and other face images.

The up-down and left-right luminance gradient of the images of the face area indicates application of a light on the face. Accordingly, by setting a classification standard for the up-down and left-right luminance gradient of the images of the face area, the image classification section 23 can classify the images into a face image of desired light application and other face images.

A three-dimensional direction of the face is determined based on a relative positional relation between feature points of the face such as an eye center point and a nostril center point. Accordingly, by setting a classification standard for the three-dimensional direction of the face, the image classification section 23 can classify the images into a face image of a desired direction and other face images.

Next, an example of an image classification method will be described.

As described above, the image classification section 23 classifies the images based on the predetermined classification standard. As the classification standard, the aforementioned standards are available. In the image classification processing, the images may be classified based on a plurality of classification standards. For example, the images can be classified by using plural kinds of classification standards such as the similarity among the face images, the average luminance of the images of the face area, the up-down and left-right luminance gradient of the images of the face area, and the three-dimensional direction of the face. Further, images which satisfy all or certain classification standards may be generated as face image partial series (e.g., face image series having a largest element among classes of the standards). This way, it is possible to carry out flexible collation processing for an imaging environment difference between the input image and the registered image. However, a more processing time is necessary as more standards are set. Accordingly, for the image classification method, standards are preferably set in accordance with system processing efficiency and an operation form.

For the image classification processing, for example, the images may be classified by using "K-means Clustering Method" described in "Image Analysis Handbook" by Takagi and Shimoda (January, 1991), a self organization map (SOM) which is a kind of neural network, or the like.

Next, an image classification example by image classification processing will be described.

Figure 2A:
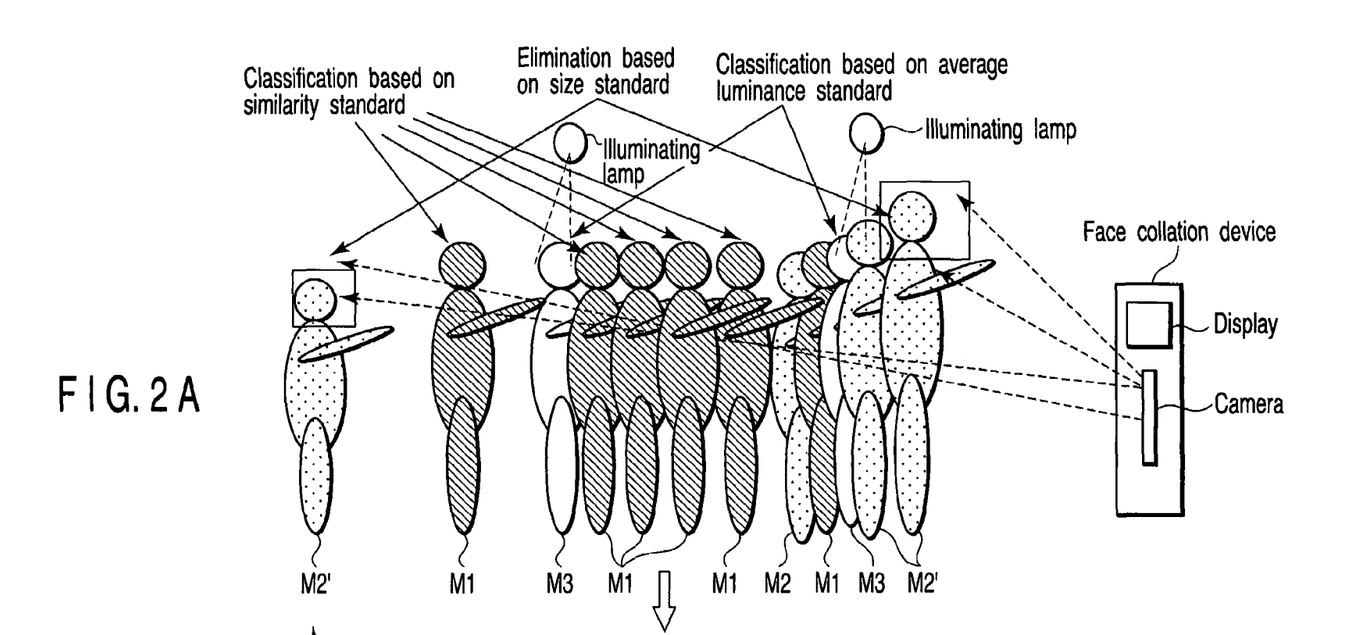
FIG. 2A is a diagram showing a classification example of images of an input image series.
Figure 2B:
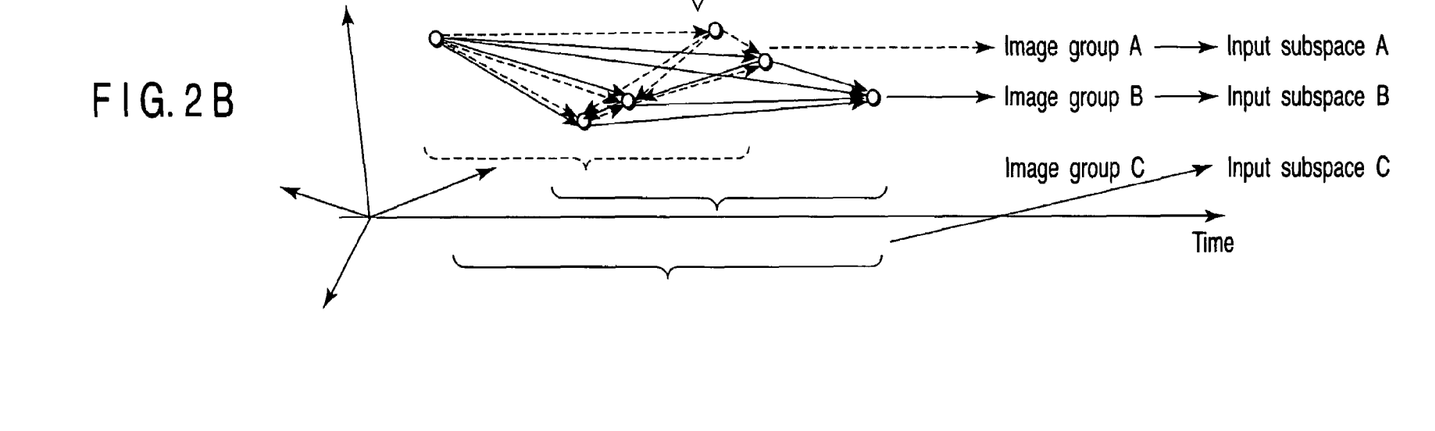
FIG. 2B is an explanatory diagram showing processing for generating a subspace of a classified image group.

FIG. 2A schematically shows images of the input image series and a classification example of the images. FIG. 2B shows subspaces obtained from image groups (input image partial series) classified as shown in FIG. 2A.

The example of FIG. 2A schematically shows frame images (images constituting the input image series) M1 to M3 of moving images including a face of a person moving toward the collation device. FIG. 2A shows the example in which the images M1 to M3 of the input image series are classified based on a size of a face area, an average luminance of face images, and a similarity among the face images.

The image M3 shown in FIG. 2A is an image in which the average luminance of the images of the face area is other than a predetermined reference value. In other words, as a classification standard based on brightness, a reference value (range) is set for the average luminance of the faces of the face area. For example, the two images M3 shown in FIG. 2A are images obtained by photographing a person when the person passes through positions closest to the illumination lamp. Accordingly, in the image M3, because of an influence of the illumination lamp, the luminance of the images of the face area may be larger than the predetermined reference value.

The images M2 and M1 shown in FIG. 2A are classified based on a similarity to other images. That is, as a classification standard for the similarity, a reference value is set to classify the images of the input image series into the images M1 and M2. This indicates that a similarity between the images M1 or the images M2 is equal to or larger than a predetermined reference. In other words, in the classification processing of the images, based on the classification standard for the similarity, the images of the input image series are classified into an image group constituted of images Ml and an image group constituted of images M2.

In FIG. 2A, images M1' of right and left ends are images in which sizes of face areas are other than a predetermined reference value. In other words, in the example shown in FIG. 2A, as a classification standard for the size of the face area, a reference value (range) is set for a size of the face area. For example, in the case of the image M2' of the left end, because it is far from the camera, a size of the face area may be too small (size of the face area is less than the reference). In the case of the image M2' of the right end, as it is near the camera, a size of the face area may be too large (size of the face area exceeds the standard). It is presumed here that an image having a face area size other than the predetermined reference value is eliminated as an input image for collation.

The images M1 to M3 classified as shown in FIG., 2A are respectively classified into image groups A to C. From the image groups A to C thus classified, as shown in FIG. 2B, subspaces (input subspaces) A to C are generated. These subspaces A to C are collated with the subspace (dictionary subspace) generated from the registered image series as the dictionary data.

Next, the selection processing of the image series of the image series selection section 24 will be described in detail.

The image series selection section 24 selects an image series from a plurality of image seriess to be collated with the dictionary data. That is, the image series selection section 24 selects a face image partial series from a plurality of face image partial series constituted of the images classified by the image classification section 23 to be collated with the dictionary data. The image series selection section 24 also selects a face image partial series to be collated with the dictionary data based on a predetermined selection standard. The selection standard is a standard for selecting a face image partial seriesuited to collation with the dictionary data among a plurality of face image partial series. In other words, the selection processing of the image series is processing for selecting a face image partial series (image series including an exceptional image) not suited to collation with the dictionary data.

Next, an example of the selection standard for selecting the image series will be described.

First, as an example of the selection standard of the image series, a case in which an average luminance of the images of the face area is a selection standard will be described.

If the selection standard is an average luminance of the images of the fade area, the image series selection section 24 first calculates an average luminance value of the face image partial series. For example, luminance average values a(0), . . . , a(k) are calculated for face areas of face images I(0), . . . , I(k) of the face image partial series, and a luminance average value A of the face image partial series is calculated as an ensemble average value $A=1/k\Sigma_0, _{k-1}(k)$ thereof. As a selection standard with respect to the luminance average value, upper and lower limit values Au and Al are set beforehand. When there is set such a selection standard, the image series selection section 24 determines whether to select each image partial series based on the following algorithm.

If A<Al or A≧Au
then unselect else select

That is, if the average luminance value A of the fade image partial series is less then the lower limit value Ai or equal to or lager than the upper limit value Au, the image series selection section 24 unselects (discards) the face image partial series. If the average luminance value A of the face image partial series is equal to or larger than Al and less than Au, the image series selection section 24 selects the face image partial series. According to such a selection standard, only the face image partial series whose average luminance value is within a predetermined reference range can be selected as face image partial series to be collated with the dictionary data.

As a selection standard of the face image partial series, a face direction average value of the images, a luminance gradient average value of the images of each face area, a similarity to an average value of the registered image seriess (registered image groups which are sources of dictionary data), or the like may be set. As in the case of the classification standard, such a standard is properly set in accordance with a setting state of the collection device, a state of the registered images, an operation state of the collation device, or the like. The selection standard may be set beforehand, or can be set by the setting section 17.

Next, the integration processing of similarities by the similarity integration section 33 will be described.

As described above, the similarity integration section 33 integrates the plurality of similarities calculated by the similarity calculation section 32 as integration processing of similarities. In this case, as an example of similarity integration processing, a method for weighting the plurality of similarities, and calculating an average value thereof as a similarity (integrated similarity) of all the input image seriess to the dictionary data will be described.

First, it is presumed that as a result of the similarity calculation processing, similarities si, j of a plurality of input subspaces pi (i is the number of input subspaces, i=0, . . . , n−1) to one dictionary subspace dj (j is the number of registered individuals in dictionary information, j=0, . . . , m−1) are obtained. In this case, an integrated similarity $S_j$ is calculated by the following equation (3) in which $w_i$ is a weight with respect to each input subspace).

$$S_j=1/n\times\Sigma_i-0, n-1(w_i\times s_{i,j}) \quad (3)$$

The weight $w_i$ can be set as occasion demands. For example, for the weight wi, similarities up to K-th in high order between the input subspaces and the dictionary subspace may be set as $w_i=1$ while the others may be set as $w_i=0$. Additionally, only a largest similarity can be set as $w_i=1$ while the others can be set as $w_i=0$. In this case, a collation result alone between the dictionary data (dictionary subspace) and a face image partial series (input subspace) of a high similarity, i.e., a collation result between the dictionary data and a similar input face image series, can be reflected in an integrated similarity.

The weight $w_i$ may be set in accordance with a classification standard in the image classification processing. The classification standard indicates features (conditions) of the images constituting each face image partial series. Accordingly, by weighting a similarity between each face image partial series and the dictionary data in accordance with the classification standard, it is possible to carry out weighting alone in accordance with the feature of each face image partial series.

For example, in the image classification processing, when a reference value for a luminance average value (average luminance value of image seriess) of the images of the face area is used as a classification standard, a weight $w_i$ can be set larger as the average luminance value of the face image partial series is more similar to the average luminance value of the registered image series which is a source of the dictionary data. In this case, by storing the average luminance value of the registered image series in the dictionary storage section 15 so as to correspond to the dictionary data, it is possible to easily determine a similarity between the average luminance value of the face image partial series and the average luminance value of the registered image series.

In the image classification processing, when a reference value for a face direction is used as a classification standard, a weight $w_i$ can be set larger as a face direction average value of the images of the face image partial series is more similar to a face direction average value of the images of the registered image series which is a source of the dictionary data. In this case, by storing the face direction average value of the registered image series in the dictionary storage section 15 so as to correspond to the dictionary data, it is possible to easily determine a similarity between the face direction average value of the face image partial series and the face direction average value of the registered image series.

As described above, in the similarity integration section 33, the plurality of similarities between the plurality of face image partial series and one dictionary data are weighted, and the average value of the weighted similarities is set as a similarity (integrated similarity) between all the face image seriess and the dictionary data. For the weights of the similarities, values are set in accordance with the features of the face image partial series or the similarities between the face image partial series and the registered image series (image series which is a source of the dictionary data).

Thus, it is possible to calculate an integrated similarity by giving weights in accordance with the similarities between the face image partial series and the registered image series. In other words, based on such an integrated similarity, the similarities of the face image partial series of conditions (states) similar to the dictionary data can be greatly reflected in the integrated similarity, while the similarities of the face image partial series of conditions (states) different from the dictionary data can be prevented from being reflected in the integrated similarity. As a result, it is possible to evaluate the similarities between all the face image seriess and the dictionary data based on the integrated similarity in which an influence of the face image partial series of the conditions different from the dictionary data is reduced.

Next, the collation processing of the collation device 2 of the first embodiment will be described.

Figure 3:
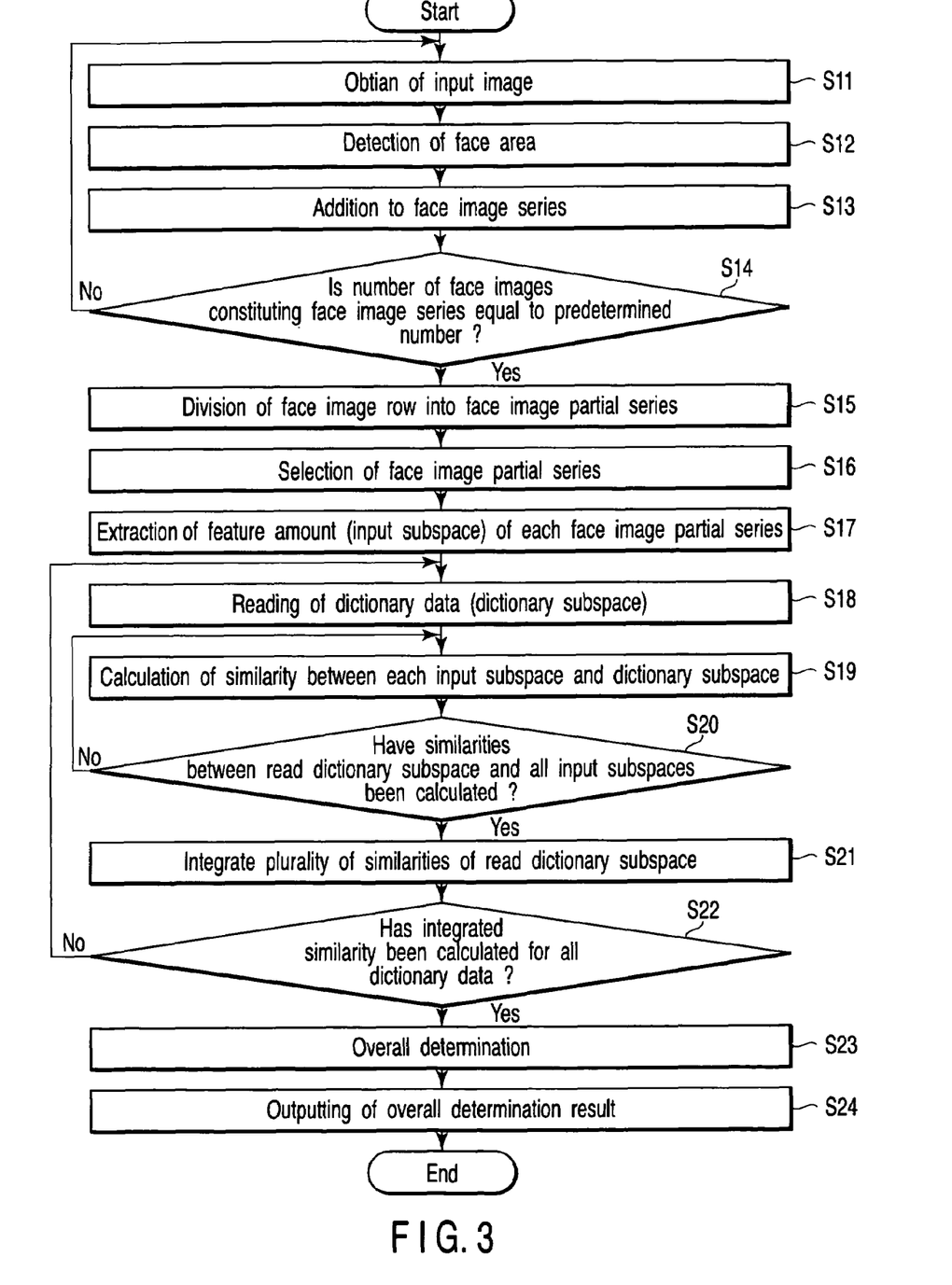
FIG. 3 is a flowchart showing a flow of collation processing according to the first embodiment.

FIG. 3 is a flowchart showing a processing example of the first embodiment.

First, the camera 1 photographs an image including a face of an authentication target person as a moving image constituted of face image data of a predetermined cycle. The camera 1 sequentially supplies image data of frames of the predetermined cycle to the image capturing section 12 of the collation device 2. In the collation device 2, the image data of the frames supplied from the camera 1 are fetched by the image capturing section 12 (step S11). These fetched image data are stored in the internal memory 12*a* of the image capturing section 12.

Upon capturing of the moving image (input image series) from the camera 1 by the image capturing section 12, the processing section 11 processes the captured moving image (input image series) by the input image processing section 13 (steps S12 to S16). As processing for the input image series, the input image processing section 13 executes face image detection processing (step S12), face image series generation processing (step S13), image classification processing (face image series division processing) (step S15), and face image partial serieselection processing (step S16)

That is, after the camera 1 captures the moving image (input image series constituted of a plurality of continuous imagers of a predetermined cycle) by the image capturing section 12, the face detection section 21 detects a face area from one frame image of the input image series, and generates a face image based on the detected face area (step S12). Upon generation of the face area by the face detection section 21, the face image series generation section 22 adds the face image generated by the face detection section 21 to the face image series (step S13). The face image detection processing and the face image series generation processing are repeated until face images constituting the face image series reach a predetermined number (NO in step S14). Accordingly, when the face images constituting the face image series reach the predetermined number (YES in step S14), a face image series constituted of the predetermined number of face images obtained from the images of the input image series is generated.

Upon generation of the face image series, the input image processing section 13 executes image classification processing by the image classification section 23 (step S15), and image series selection processing by the image series selection section 24 (step S16).

The image classification processing is processing for classifying the face images of the face image series and generating face image partial series of the classified images based on the aforementioned classification standard. In other words, the image classification processing is processing for dividing the face image series (input image series) into a plurality of face image partial series (input image partial series). The image series selection processing is processing for determining whether to use the image series as an image series for collation based on the predetermined selection standard. For example, when a plurality of face image partial series are generated by the image classification section 23, in the image series selection processing, based on the aforementioned selection standard, use/nonuse as an image series for collation is selected for each face image partial series generated by the image classification section 23.

That is, when the face image series is generated by the face image generation section 22, the image classification section 23 classifies the face images of the face image series generated by the face image series generation section 22, and generates a face image partial series for each of the classified face images (step S15). In this case, it is presumed that the image classification section 23 generates a plurality of face image partial series from the entire face image series.

Upon generation of the face image partial series by the image classification section 23, the image series selection section 24 determines whether to use each face image partial series as an image series for collation to be collated with the dictionary data stored in the dictionary storage section 15 based on the aforementioned selection standard (step S16). In this case, it is presumed that the image series selection section 24 selects at least one face image partial series as an image series for collation.

When at least one face image partial series is selected by the image series selection section 24, the input image processing section 13 supplies the selected face image partial series as an image series to be collated with the dictionary data to the collation section 14. The collation section 14 collates at least one face image partial seriesupplied from the input image processing section 13 with the dictionary data stored in the dictionary storage section 15.

The collation section 14 that has received at least one face image partial seriesupplied from the input image processing section 13 to be collated with the dictionary data executes image series feature extraction processing (step S17), dictionary data reading processing (step S18), similarity calculation processing (step S19), similarity integration processing (step S21), overall determination processing (step S22), and the like.

That is, upon reception of the face image partial serieselected by the image series selection section 24 of the input image processing section 13, the image series feature extraction section 31 of the collation section 14 extracts a feature amount of each face image partial series (step S17). For example, the feature amount of the face image partial series is extracted as a subspace. In this case, a feature vector is extracted as a face feature amount from each image of the face image partial series, and a subspace (input subspace) is generated from the feature vector. This subspace indicates a statistical feature amount of the face image partial series.

Upon calculation of the feature amount of each face image partial series by the image series feature extraction section, the similarity calculation section 32 reads one dictionary data from the dictionary storage section 15 (step S18), and calculates a similarity between the read dictionary data (dictionary subspace) and the feature amount of each face image partial series (input subspace) (step S19). As described above, this similarity calculation processing is processing for calculating a similarity of at least one face image partial series to the registered image series as one dictionary data. Accordingly, in the similarity calculation processing, similarities equal to the number of face image partial series with respect to one dictionary data are calculated. In the similarity calculation processing, similarities may be calculated by "Restrictive Mutual Subspace Method" described in the document 3. In this case, as described above, it is presumed that a similarity between the dictionary subspace generated from the registered image series and each input subspace generated from each input image partial series is calculated. Thus, in the similarity calculation processing, similarities equal in number to face image partial series selected by the image series selection section 24 are calculated with respect to one dictionary data.

When a plurality of similarities are calculated by the similarity calculation section 32, the similarity integration section 33 integrates the similarities (step S21). In this integration processing, for example, average values of weighted similarities are integrated to be calculated as a similarity by the aforementioned method.

The processing of each of the steps S18 to S21 is carried out for each dictionary data. That is, if there is no integrated similarity calculated for all the dictionary data (NO in step S22), the collation section 14 repeatedly executes the steps S18 to S21. If there is an integrated similarity calculated for all the dictionary data (YES in step S22), the collation section 14 determines a last collation result between the dictionary data and the input image series by the overall determination section 34 (step S23). In other words, the overall determination section 34 determines a registrant (person whose dictionary data has been registered) whose face image the face image detected from the input image matches based on the integrated similarity to each dictionary data obtained by the similarity integration processing.

For example, if a maximum integrated similarity among the integrated similarities to the dictionary data is equal to or larger than a predetermined threshold value, it is determined that the face image detected from the input image matches the face image of the registrant of the dictionary data in which the maximum integrated similarity has been set. In this case, the overall determination section 34 outputs information indicating the registrant of the dictionary data matched with the face image detected from the input image (e.g., identification information or the like of the registrant corresponding to the dictionary data) as an overall determination result to the output section 16.

If the maximum integrated similarity is less than the predetermined threshold value, the overall determination section 34 determines that the face image detected from the input image does not math the face images of any registrants. In this case, the overall determination section 34 outputs a message that the face image detected from the input image does not match the dictionary data of any registrants as an overall determination result to the output section 16.

Further, upon reception of the aforementioned overall determination result from the overall determination section 34 of the collation section 14, the output section 16 outputs information regarding the overall determination result to the external device (step S24). For example, if the display device 3 is connected to the output section 16 (e.g., if the collation device is used for the person monitoring system), the output section 16 outputs display data to display the overall determination result to the display device 3.

If the traffic controller 4 is connected to the output section 16 (e.g., if the collation device is used for the person passage control system), the output section 16 outputs a control signal to control a passage of the person in accordance with the overall determination result to the traffic controller 4. In this case, the output section 16 outputs a control signal to permit a passage of the person to the traffic controller 4 upon reception of a determination result that the face image of the registrant permitted to pass matches the face image detected from the input image, and a control signal to inhibit a passage of the person to the traffic controller 4 upon reception of a determination result that the face image of the registrant permitted to pass does not match the face image detected from the input image.

As described above, according to the collation device of the first embodiment, the images of the face image series as the input image series are classified into the plurality of face image groups (face image partial series) based on the predetermined classification standard, the plurality of face image partial series constituted of the classified face image groups are collated with the dictionary data, the plurality of similarities obtained as the collation result between the face image partial series and the dictionary data are integrated, and overall determination is made as to the collation result between the face images of the input image series and the dictionary data based on the integrated similarity.

Thus, according to the collation device of the first embodiment, it is possible to collate the input image groups (image groups classified based on the classification standard) similar in conditions such as face direction or illumination conditions with the dictionary data. In other words, according to the collation device of the first embodiment, a similarity to the dictionary data can be evaluated for each input image group selected under specific conditions. For example, according to the collation device of the first embodiment, it is possible to evaluate similarities between all the input image groups and the dictionary data in a comprehensive manner by eliminating or disregarding the collation result between the input image group different in conditions from the registered image which is a source of the dictionary data and the dictionary data. As a result, according to the collation device of the first embodiment, it is possible to improve collation accuracy even in the case of collating the input image of large fluctuation such as a moving image obtained by photographing a face of the moving person with the dictionary data.

According to the collation device of the first embodiment, based on the predetermined selection standard, the face image partial series to be collated with the dictionary data is selected from the plurality of face image partial series constituted of the face image groups classified based on the predetermined classification standard. Thus, as the image group photographed under conditions greatly different from the dictionary data or the image group not suited for collation processing can be eliminated, it is possible to improve collation accuracy. Further, as the image group not suited for collation with the dictionary data included in the input image series can be eliminated before collation processing, it is possible to shorten a processing time required for collation processing and to improve a processing speed of the collation processing.

According to the collation device of the first embodiment, when the plurality of similarities obtained by collation between the plurality of face image partial series and the dictionary data are integrated, the average value of the similarities weighted in accordance with the features of the face image partial series is set as a similarity (integrated similarity) between all the input image seriess and the dictionary data. Thus, it is possible to obtain a similarity between all the input image seriess and the dictionary data reflecting the features of the face image partial series thereby improving collation accuracy.

Furthermore, according to the first embodiment, it is possible to set a classification standard for classifying the input images or a selection standard for selecting a face image partial series by the setting section. Thus, setting can be carried out in accordance with an installation state of the collation device, a state of the registered image series, or an operation form of the collation device as occasion demands. As a result, it is possible to improve collation accuracy.

Next, a second embodiment will be described.

The first embodiment has been described by way of processing of collating the images obtained from the collation target person with the dictionary data, i.e., processing of determining the registrant of the collation target person. This collation processing is called 1:N collation. On the other hand, the second embodiment will be described by way of processing of specifying one dictionary data and collating a face image obtained from a collation target person with the specified dictionary data, i.e., processing of determining whether the collation target person is a registrant of the specified dictionary data. This collation processing is called 1:1 collation.

Next, a configuration of a collation device 51 of the second embodiment will be described.

Figure 4:
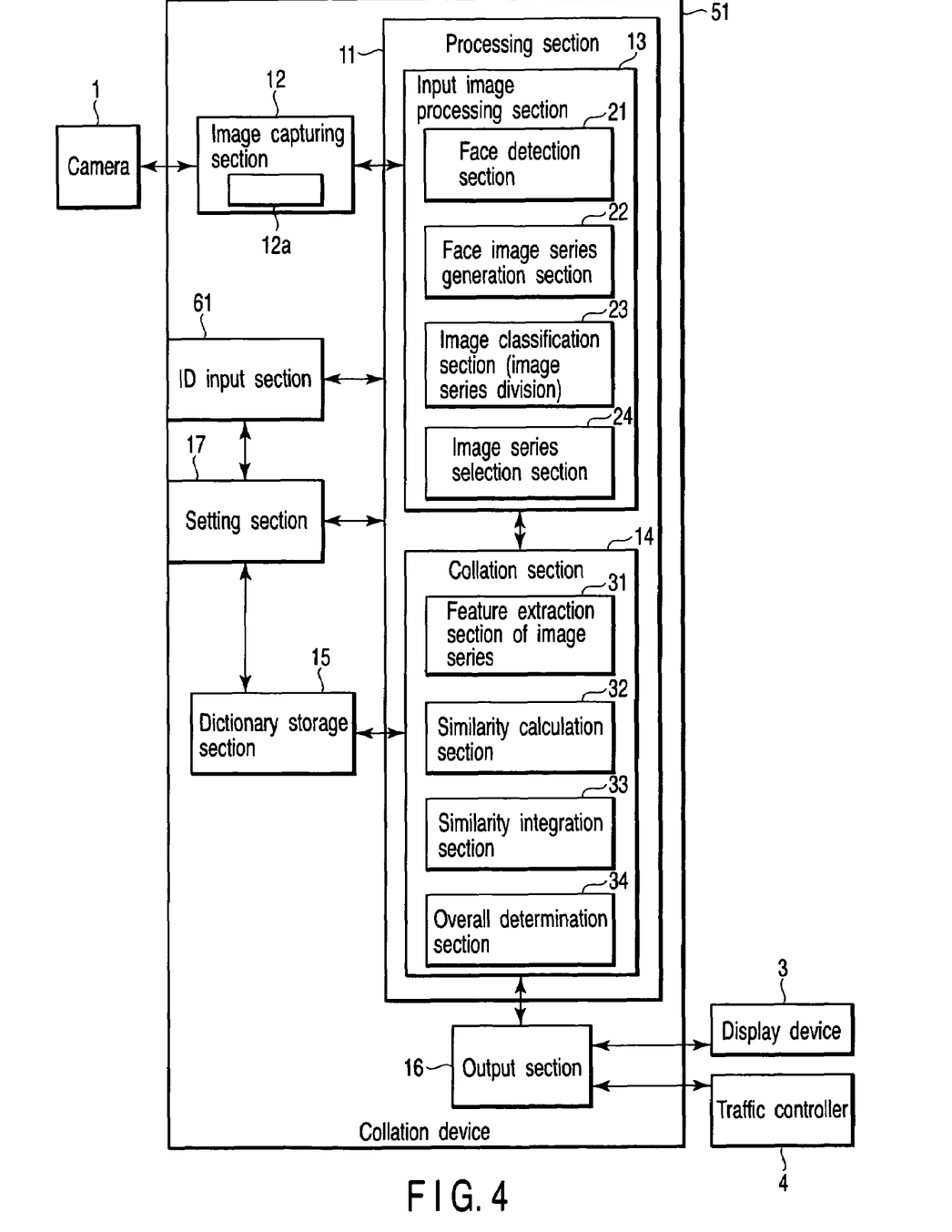
FIG. 4 is a block diagram schematically showing a configuration example of a collation device to which a collection method of biometric information is applied according to a second embodiment.

FIG. 4 is a block diagram schematically showing a configuration example of a person authentication system which includes the collation device 51 of the second embodiment.

The person authentication system including the collation device 51 of FIG. 2 is mainly different from the person authentication system including the collation device 2 of the first embodiment shown in FIG. 1 in that an ID input section is disposed to fetch identification information. In the collation device 51 of FIG. 4, for components having functions similar to those of the collation device 2 of FIG. 1, similar places are denoted by similar reference numerals, and detailed description thereof will be omitted.

The ID input section 61 is for fetching identification information (may simply be referred to as ID hereinafter) to specify one dictionary data. The identification information is information inherent in each dictionary data corresponding to each dictionary data. The identification information may be information which the collation target person or a manager inputs by a keyboard or the like, or information read from a storage medium such as an IC card owned by the collation target person. In the former case, the ID input section 61 includes a keyboard, an interface for fetching information input to the keyboard, and the like. In the latter case, the ID input section 61 includes a reader (e.g., IC card reader) for reading information from a storage medium (IC card), an interface for fetching information from the reader, and the like. Additionally, the identification information may be a combination of information input from the former and information input from the latter.

A collation section 14 of the collation device 51 collates dictionary data corresponding to the identification information fetched by the ID input section with each face image partial series processed by an input image processing section 13. In other words, while the collation section 14 of the collation device 51 has the same collation processing function as that of the collation section 14 of the collation device 2 shown in FIG. 1, collation processing actually executed by the collation section 14 of the collation device 51 is not between all dictionary data stored in a dictionary storage section 51 and each face image partial series but between dictionary data specified by the identification information and each face image partial series.

Accordingly, in the collation device 51, a similarity calculation section 32 calculates a similarity between the dictionary data corresponding to the identification information and each face image partial series. A similarity integration section 33 calculates an integrated similarity between the dictionary data corresponding to the identification information and all the input image seriess by integrating a plurality of similarities calculated by the similarity calculation section 32. Further, an overall determination section 34 determines whether a person of a face image detected from each image of the input image series is a registrant of the dictionary data corresponding to the identification information based on whether the integrated similarity calculated by the similarity integration section 22 is equal to or larger than a predetermined threshold value. For example, the overall determination section 34 determines that the person of the face image detected from each image of the input image series is not a registrant of the dictionary data corresponding to the identification information if the integrated similarity calculated by the similarity integration section 33 is less than the predetermined threshold value, and determines that the person of the face image detected from each image of the input image series is a registrant of the dictionary data corresponding to the identification information if the integrated similarity calculated by the similarity integration section 33 is equal to or larger than the predetermined threshold value.

Furthermore, in the collation device 51, a classification standard, a selection standard, a weight standard with respect to each similarity in similarity integration processing, or the like can be set for each dictionary data. This can be realized by storing setting information such as the classification standard, the selection standard, the weight standard with respect to each similarity in similarity integration processing, or the like for each dictionary data in a dictionary storage section 15 or a setting section 17.

In this case, the setting section 17 reads the setting information corresponding to the identification information obtained from the ID input section 61 from the dictionary storage section 15, and sets a setting value based on the read setting information for each section (e.g., the image classification section 23, the image series selection section 24, or the similarity integration section 33). By setting each section based on the setting value for each dictionary data, processing such as classification of the face image seriess, selection of a face image partial series, or integration of similarities (i.e., determination based on similarity) can be executed based on optimal setting thereby realizing highly accurate processing.

For the classification standard, the selection standard, the weight standard of each similarity, or the like as setting information for each dictionary data, for example, as in the case of the first embodiment, a standard value regarding an average luminance value of images in a face area, a luminance gradient of the images in the face area, face directions of the images in the face area, or various average values obtained from images of the registered image series can be applied.

Next, collation processing of the collation device 51 of the second embodiment will be described.

Figure 5:
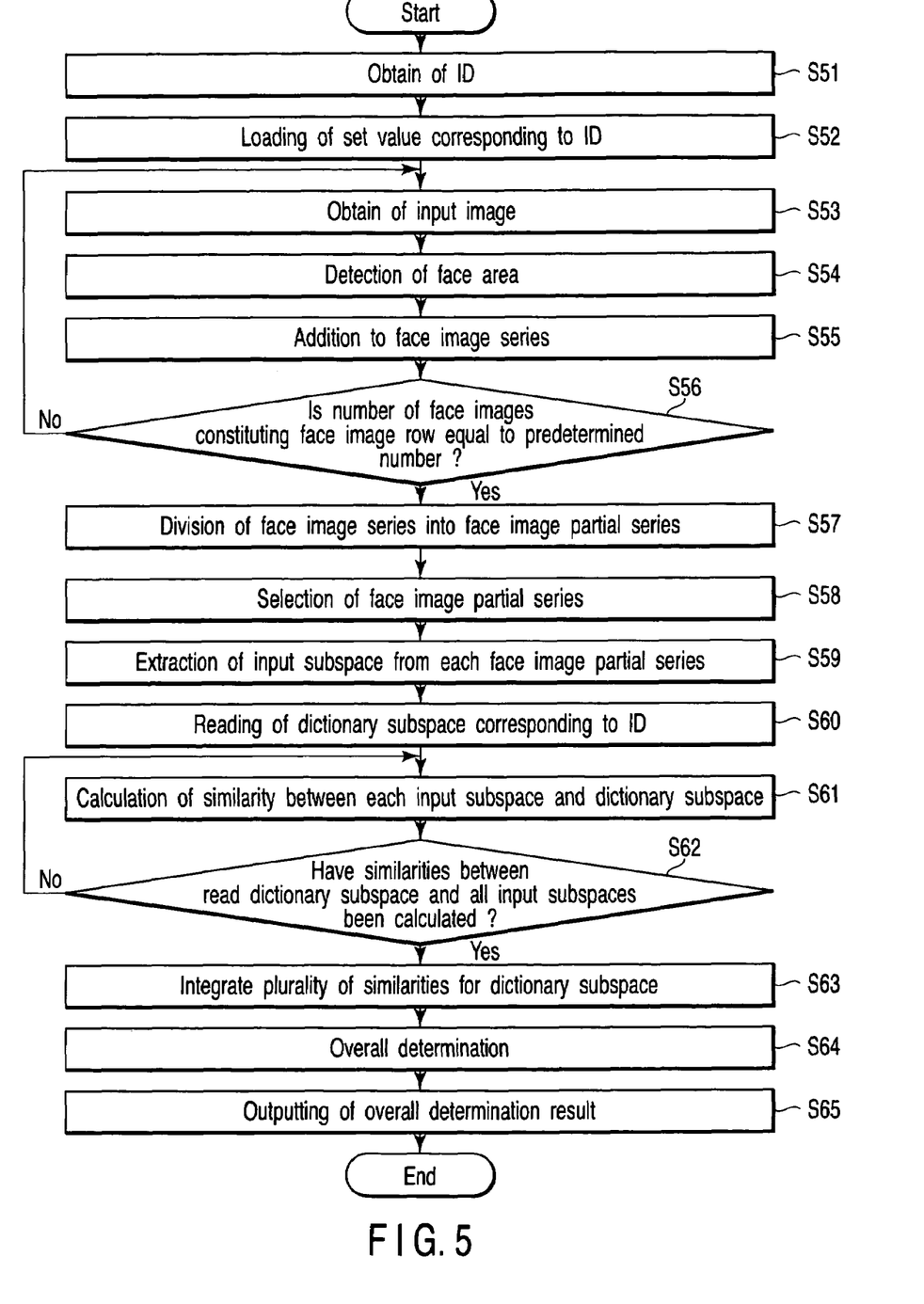
FIG. 5 is a flowchart showing a flow of collation processing according to the second embodiment.

FIG. 5 is a flowchart showing a collation processing flow of the collation device 51 of the second embodiment.

The collation processing of FIG. 5 is different from that of FIG. 3 in that processing of the steps S51 and S52 is added and processing contents of steps S60, S64 and S65 are changed. In other words, the processing of the steps S53 to S59 and S61 to S63 is similar to that of the steps S11 to S17 and S19 to S21 shown in FIG. 3, and thus description thereof will be omitted.

First, a collation target person or a manager inputs the identification information corresponding to the dictionary data to the ID input section 61. For example, in the form of inputting the identification information to the keyboard, the collation target person himself or the manager inputs the identification information of the collation target information by the keyboard. In the form of using information stored in the IC card as identification information, the collation target person himself or the manager provides the IC card storing the identification information to the card reader. Accordingly, the ID input section 61 fetches the identification information corresponding to the dictionary data to be collated with the input image series into the collation device 51 (step S51).

Upon fetching of the identification information by the ID input section 61, as described above, the setting section 17 reads setting information corresponding to the fetched identification information, and executes setting for each section (e.g., the image classification section 23, the image series selection section 24 or the similarity integration section 33) based on the setting information (steps S52). If there is no setting information set for each dictionary data, the processing of the step S52 may be omitted.

In this state, the processing section 11 executes processing similar to that of the steps S11 to S17 for the input image series (steps S53 to S59). In other words, through the processing of the steps S53 to S59, a feature amount (input subspace of a face image partial series elected by selection processing of an image series) of at least one face image partial series to be collated with the dictionary data is generated from the input image series.

Upon generation of at least one input subspace to be collated with the dictionary data, the similarity calculation section 32 of the collation section 14 reads a dictionary subspace as the dictionary data corresponding to the identification information fetched by the ID input section 61 (step S60). Upon reading of the dictionary subspace corresponding to the identification information, as in the case of the processing of the steps S19 to S21, the collation section 14 calculates similarities between the dictionary subspace and the input subspaces by the similarity calculation section 32 and the similarity integration section 33, and integrates the similarities to obtain an integrated similarity (steps S61 to S63).

After calculation of the similarity (integrated similarity) between the dictionary data corresponding to the identification information and all the input image series, the overall determination section 34 determines whether the person of the face image detected from each image of the input image series is a person (registrant) of the dictionary data corresponding to the input identification information based on whether the integrated similarity is equal to or larger than a predetermined threshold value (step S64). Such a determination result is output from the overall determination section 34 to the output section 16. The output section 16 outputs information based on the determination result received from the overall determination section 34 of the collation section 14 to the external device (step S65).

For example, if the display device 3 is connected to the output section 16 (e.g., if the collation device is used for the person monitoring system), the output section 16 outputs display data to indicate whether the face image detected from each image of the input image series is a person corresponding to the identification information to the display device 3.

If the traffic controller 4 is connected to the output section 16 (e.g., if the collation device is used for the person passage control system), the output section 16 outputs a control signal to permit a passage of the person to the traffic controller 4 upon reception of a determination result that the person of the face image detected from each image of the input image series is a person of the dictionary data corresponding to the identification information, and a control signal to inhibit a passage of the person to the traffic controller 4 upon reception of a determination result that the person of the face image detected from each image of the input image series does not match the person of the dictionary data corresponding to the identification information.

As described above, according to the collation device of the second embodiment, in addition to the collation processing of the first embodiment, collation is carried out between the dictionary data specified by the identification information and the input image series based on setting contents corresponding to the dictionary data specified by the identification information. Thus, input images of conditions similar to the dictionary data can be selected, and the selected input images can be collated with the dictionary data, thereby realizing efficient and highly accurate collation processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for collating biometric information, comprising:

capturing images of a moving subject to form an image group;

storing dictionary data based on the image group for registration in a memory;

inputting the image group constituted of a plurality of images;

classifying the input image group into a plurality of image subgroups based on a luminance of image areas of pieces of biometric information contained in the images;

collating each classified image subgroup with the dictionary data stored in the memory; and determining a result of collation of biometric information contained in each image of the input image group with the dictionary data based on a result of the collation of each classified image subgroup with the dictionary data.

2. The method according to claim 1, wherein the classifying is classifying the input image group into the plurality of image subgroups based on an average luminance value of image areas of pieces of biometric information contained in the images.

3. The method according to claim 1, wherein the classifying is classifying the input image group into the plurality of image subgroups based on a luminance gradient of image areas of pieces of biometric information contained in the images.

4. The method according to claim 1, further comprising selecting at least one to be collated with the dictionary data from the classified image subgroups, wherein the collating is collating at least one selected from the classified image subgroups with the dictionary data.

5. The method according to claim 4, wherein the selecting is selecting the image subgroup based on a similarity between an attribute value obtained from each image of the classified image subgroups and an attribute value obtained from each image of the registration image group which is a source of the dictionary data.

6. The method according to claim 5, wherein the attribute value is an average luminance value of image areas of pieces of biometric information contained in the images of the image group.

7. The method according to claim 4, further comprising setting a selection standard for selecting at least one to be collated with the dictionary data from the classified image subgroup.

8. The method according to claim 5, wherein the attribute value is information indicating a luminance gradient of the biometric information contained in each image of the image group.

9. The method according to claim 1, wherein:

dictionary data based on the registration image group of each person is stored as dictionary data of each person in the memory, the determining is determining a result of collation of the input image group with the dictionary data of each person stored in the memory, and overall determining the dictionary data stored in the memory which is most similar to the input image group based on the collation result of each dictionary data with the input image group.

10. The method according to claim 1, further comprising receiving identification information input to specify dictionary data stored in the memory, wherein the dictionary data based on the registration image group is stored in the memory so as to correspond to the identification information, the collating is collating each classified image subgroup with the dictionary data corresponding to the input identification information, and the determining is determining a result of collation of biometric information contained in the input image group with the dictionary data based on a result of the collation of the dictionary data corresponding to the input identification information with each image subgroup.

11. A device for collating biometric information, comprising:

an image capturing section which captures images of a moving subject to form an image group;

a memory which stores dictionary data based on the image group for registration;

an image input section which inputs the image group constituted of a plurality of images;

a classification section which classifies the image group input by the image input section into a plurality of image subgroups based on a luminance of image areas of pieces of biometric information contained in the images;

a collation section which collates each image subgroup classified by the classification section with the dictionary data stored in the memory; and a determination section which determines a result of collation of biometric information contained in each image of the image group input by the image input section with the dictionary data based on a result of the collation of each image subgroup classified by the classification section with the dictionary data.

12. The device according to claim 11, wherein the classification section classifies the image group input by the image input section based on an average luminance value of image areas of pieces of biometric information contained in the images.

13. The device according to claim 11, wherein the classification section classifies the image group input by the image input section based on a luminance gradient of pieces of biometric information contained in the images.

14. The device according to claim 11, further comprising a selection section which selects at least one to be collated with the dictionary data from the image subgroups classified by the classification section, wherein the collation section collates at least one selected by the selection section from the image subgroups classified by the classification section with the dictionary data.

15. The device according to claim 14, wherein the selection section selects at least one image subgroup based on a similarity between an attribute value obtained from each of the image subgroups classified by the classification section and an attribute value obtained from the registration image group which is a source of the dictionary data.

16. The device according to claim 15, wherein the attribute value is an average luminance value of image areas of pieces of biometric information contained in the images of each image group.

17. The device according to claim 14, further comprising a setting section which sets a selection standard on which the selection section selects at least one to be collated with the dictionary data from the image subgroup classified by the classification section.

18. The device according to claim 15, wherein the attribute is information indicating a luminance gradient of the biometric information contained in each image of the image group.

19. The device according to claim 11, wherein:

the memory stores, as dictionary data of each person, dictionary data based on the registration image group of each person, and the determination section determines a result of collation of the image group input by the image input section with the dictionary data of each person stored in the memory, and overall determines the dictionary data stored in the memory which is most similar to the image group input by the image input section based on a result of the collation of each dictionary data with the image group input by the image input section.

20. The device according to claim 11, which further includes an input section which inputs identification information to specify dictionary data stored in the memory, wherein:

the memory stores the dictionary data based on the registration image group so as to correspond to the identification information, the collation section collates each image subgroup classified by the classification section with the dictionary data which is stored in the memory and which corresponds to the identification information input by the input section, and the determination section determines a result of collation of biometric information contained in the image group input by the image input section with the dictionary data based on a result of the collation of the dictionary data corresponding to the identification information input by the input section with each image subgroup.

* * * * *